(12) United States Patent
Sorosiak

(10) Patent No.: US 6,442,323 B1
(45) Date of Patent: Aug. 27, 2002

(54) FLEXIBLE OPTICAL CIRCUIT HAVING A PROTECTIVE FOAM LAYER

(75) Inventor: James L. Sorosiak, Huntersville, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 09/755,258

(22) Filed: Jan. 5, 2001

(51) Int. Cl.[7] .................................................. G02B 6/00
(52) U.S. Cl. ........................... 385/137; 385/63; 385/70
(58) Field of Search .......................... 385/137, 53, 62, 385/63, 70, 71, 136

(56) References Cited

U.S. PATENT DOCUMENTS

| | | | |
|---|---|---|---|
| 4,839,635 A | * | 6/1989 | Harris et al. ............ 340/815.42 |
| 5,499,314 A | | 3/1996 | Leite et al. |
| 5,566,269 A | * | 10/1996 | Eberle et al. ............... 385/134 |
| 5,905,262 A | * | 5/1999 | Spanswick .............. 250/361 R |
| 6,005,991 A | | 12/1999 | Knasel |
| 6,272,263 B1 | * | 8/2001 | Schricker ..................... 385/14 |

* cited by examiner

Primary Examiner—Brian Sircus
Assistant Examiner—Hae Moon Hyeon
(74) Attorney, Agent, or Firm—Alston & Bird LLP

(57) ABSTRACT

A flexible optical circuit is provided that includes at least one layer formed of a foam material in order to provide strain relief for the optical fibers and to improve the crush resistance of the flexible optical circuit. The flexible optical circuit includes a substrate and at least one optical fiber disposed upon the substrate. In one embodiment, the substrate is formed of a foam material, such as a silicone or polyurethane foam. The flexible optical circuit can also include a protective layer disposed upon at least a portion of the substrate so as to overlie at least a segment of at least one optical fiber, such as those segments at which the stress is concentrated. In addition to or instead of forming the substrate from a foam material, the protective layer may be formed of a foam material.

26 Claims, 3 Drawing Sheets

FLEXIBLE OPTICAL CIRCUIT HAVING A PROTECTIVE FOAM LAYER

FIELD OF THE INVENTION

The present invention relates generally to flexible optical circuits and, more particularly, to flexible optical circuits designed to provide strain relief for the optical fibers.

BACKGROUND OF THE INVENTION

Flexible optical circuits are utilized in a wide variety of applications in which fiber management is desirable. For example, flexible optical circuits are commonly utilized as optical backplanes to interconnect a number of printed circuit boards or the like. Similarly, flexible optical circuits can serve as ribbons of optical fibers in order to route the optical fibers in an organized fashion.

Regardless of the application, a flexible optical circuit is commonly formed of a plastic substrate, typically formed of a polyimide or similar types of engineering thermoplastic materials, such as polyetherimide or polybutylene terphthalate. Most commonly, however, the substrate is formed of Kapton™ polyimide. The substrate is coated with an adhesive, such as a silicone adhesive, and a plurality of optical fibers are placed upon the adhesive-coated substrate. In particular, the optical fibers are placed in a predetermined pattern upon the substrate in order to appropriately route the optical fibers. The flexible optical circuit is then completed by placing another layer over the optical fibers. For example, a flexible optical circuit can include another layer of the plastic material that forms a substrate in order to effectively sandwich the optical fibers between the layers of plastic. By way of example, the flexible optical circuit can include a layer formed of Kapton™ polyimide that overlies the optical fibers and is adhered to the substrate. Alternatively, a conformal coating can be applied so as to cover the substrate and the optical fibers adhered to the substrate. For example, a conformal coating of silicone can be sprayed on the substrate in order to cover the optical fibers as well as other portions of the substrate.

In designing a flexible optical circuit, it is desirable for the flexible optical circuit and, more particularly, for the components that form the flexible optical circuit, to be flame retardant. Additionally, a flexible optical circuit preferably has good environmental resistance properties. In this regard, the flexible optical circuit preferably maintains approximately the same generally small level of attenuation for signals transmitted via the optical fibers as the temperature and humidity to which the flexible optical circuit is subjected are varied within a predetermined range of temperatures and humidities. Still further, the flexible optical circuit preferably has good handling characteristics. In other words, the flexible optical circuit is preferably relatively flexible to facilitate routing of the optical fibers. As such, the flexible optical circuit must be capable of being readily bent or otherwise flexed.

Unfortunately, the substrate of most flexible optical circuits is much less flexible than the optical fibers. In other words, the substrate of most flexible optical circuits is relatively stiff or inflexible relative to the optical fibers. This relative inflexibility is compounded in instances in which the flexible optical circuit includes a second layer of plastic, such as a second layer formed of Kapton™ polyimide, that covers the optical fibers and other portions of the substrate. Accordingly, conventional flexible optical circuits disadvantageously subject the optical fibers to stress.

Typically, the stress is concentrated upon the optical fibers at one or more points depending upon the configuration of the flexible optical circuit. For example, most flexible optical circuits are designed such that the optical fibers extend beyond the edge of the substrate. As such, the optical fibers are subjected to stress along the edge of the substrate. Additionally, fiber optic connectors are commonly mounted upon respective optical fibers of a flexible optical circuit. In these instances, the substrate upon which the optical fibers are mounted typically extends into the connector boot and into the rearward end of the spring push element of the fiber optic connector. Nevertheless, the optical fibers are typically subjected to stress at the point beyond the edge of the substrate at which the fiber optic connector is mounted to the optical fiber. In embodiments in which the flexible optical circuit includes a second layer of plastic, such as a second layer of Kapton™ polyimide, that covers the optical fibers and the substrate, the second layer of plastic may delaminate and peel back from the substrate as the flexible optical circuit is bent or otherwise flexed. In these instances, stress is also concentrated on the optical fibers at the point at which the second layer of plastic becomes delaminated from the substrate. In each of these instances, the points along the optical fiber at which the stress is concentrated will disadvantageously increase the attenuation of the optical signals transmitted via the optical fibers.

In order to protect the optical fibers from the concentrations of stress, some flexible optical circuits have included shrink tubing and/or strain relief boots through which optical fibers extend. By positioning the shrink tubing or the strain relief boot upon that segment of the optical fiber at which the stress is concentrated, the optical fiber can be at least partially shielded from the stress such that the signals propagating along the optical fibers are not attenuated to the same degree. For example, the shrink tubing or strain relief boot may be placed upon an optical fiber proximate the edge of the substrate in order to protect the optical fiber from the concentration of stress that typically occurs at the edge of the substrate.

In addition to increasing the cost of a flexible optical circuit, strain relief boots and shrink tubing create other difficulties. In this regard, strain relief boots and shrink tubing are typically rather bulky, and/or inflexible relative to the remainder of the flexible optical circuit. As such, the resulting flexible optical circuit is typically heavier and somewhat more difficult to handle than conventional flexible optical circuits that do not include either strain relief boots or shrink tubing. Additionally, it is generally more difficult and laborious to fabricate flexible optical circuits that include strain relief boots and/or shrink tubing, thereby increasing the time required for fabrication and, in many instances, the cost of the resulting flexible optical circuit.

Even in instances in which segments of the optical fibers are protected from concentrations of stress by strain relief boots and/or shrink tubing, the majority of the length of the optical fibers is not protected by strain relief boots and/or shrink tubing. As such, these other unprotected segments of the optical fibers are susceptible to damage and therefore increased attenuation as a result of inadvertent contact with the optical fibers. For example, flexible optical circuits are typically deployed in electronics cabinets or other closures that also house a variety of other components, typically formed of metal or hard plastic. As such, these other components may inadvertently contact the flexible optical circuit during installation or subsequently during the repair, thereby damaging the optical fibers if the components contact those segments of the optical fibers that are not protected by a strain relief boot or shrink tubing. Accordingly, most conventional flexible optical circuits disadvantageously have a relatively small crush resistance.

SUMMARY OF THE INVENTION

An improved flexible optical circuit is therefore provided that includes at least one layer formed of a foam material in order to provide strain relief for the optical fibers and to improve the crush resistance of the flexible optical circuit. Accordingly, the flexible optical circuit need not include strain relief boots and/or shrink tubing such that the flexible optical circuit is simpler to manufacture and generally less expensive than conventional flexible optical circuits having strain relief boots and/or shrink tubing.

A flexible optical circuit includes a substrate and at least one optical fiber disposed upon the substrate. In one advantageous embodiment, the substrate is formed of a foam material, such as a silicone or polyurethane foam. As such, the foam substrate provides both crush resistance and strain relief for the optical fibers. Preferably, the foam material that forms the substrate includes a non-porous surface upon which the optical fibers are mounted. Additionally, the foam material that forms the substrate is preferably flame retardant. Typically, the flexible optical circuit also includes an adhesive, such as a silicone adhesive, disposed upon at least a portion of the substrate for attaching the optical fibers to the substrate. The flexible optical circuit can also include a conformal coating disposed upon the substrate and overlying the optical fibers.

In addition to the substrate and the optical fibers disposed upon the substrate, the flexible optical circuit of one advantageous embodiment also includes a protective layer disposed upon at least a portion of the substrate so as to overlie at least a segment of at least one optical fiber. According to this embodiment, at least one of the substrate and the protective layer is formed of a foam material to provide strain relief for the optical fibers. In this regard, the substrate may be formed of the foam material as described in conjunction with the foregoing embodiment. Alternatively, the protective layer may be formed of the foam material, irrespective of whether the substrate is also formed of a foam material or is formed of another material, such as a polyimide or other plastic material. In embodiments in which the protective layer is formed of a foam material, the protective layer also advantageously provides strain relief for the optical fiber and, at least some, crush resistance for the optical fibers.

In embodiments in which the protective layer is formed of a foam material, the foam material also preferably includes a non-porous surface facing the optical fibers. In addition, the foam material that forms the protective layer of these embodiments is preferably flame retardant and is typically formed of either a silicone or polyurethane foam. In embodiments in which the protective layer is formed of a foam material, the protective layer may cover the entire substrate including all segments of the optical fibers. Alternatively, the protective layer may be designed to cover those segments of the optical fibers subjected to the largest concentrations of stress, while leaving other segments of the optical fibers exposed. In this regard, the protective layer of foam material is preferably disposed proximate the edges of the substrate to protect the optical fibers from the concentrations of stress that otherwise occur at the edge of the substrate. In this regard, the substrate can include a main section and at least one tab extending outwardly therefrom. In this embodiment, the protective layer of foam material is preferably disposed upon at least a portion of the at least one tab. Additionally, the flexible optical circuit may include at least one fiber optic connector mounted upon a respective optical fiber. In this embodiment, the protective layer of foam material is preferably disposed proximate the fiber optic connector in order to protect the optical fiber from the concentration of stress that otherwise would occur at the fiber optic connector. Since the protective layer generally does not cover the entire substrate, the flexible optical circuit can also include a conformal coating disposed upon the substrate and overlying the optical fibers. The protective layer of foam material can then be disposed upon portions of the conformal coating, such as those portions at which the stress is concentrated upon the optical fibers.

In each of these embodiments, the improved flexible optical circuit provides strain relief for the optical fibers as a result of the inclusion of a layer of foam material. As a result of the strain relief, the improved flexible optical circuit can transmit signals with lower levels of attenuation. Moreover, the improved flexible optical circuit provides improved crush resistance, thereby protecting the flexible optical circuit and, in particular, the optical fibers from physical damage as a result of contact with other components within an electronics cabinet, closure or the like. Additionally, the improved flexible optical circuits of the present invention and, in particular, those embodiments of the improved flexible optical circuits that include a substrate formed of a foam material are quite flexible, thereby reducing the concentration of stress upon the optical fibers and improving the handling characteristics of the flexible optical circuit so as to facilitate installation, repair and the like of the improved flexible optical circuit. Further, the improved flexible optical circuits of the present invention can be efficiently fabricated, thereby reducing the time required for manufacture and the costs of manufacture relative to the fabrication of conventional flexible optical circuits that include shrink tubing and/or strain relief boots.

BRIEF DESCRIPTION OF THE DRAWINGS

Figure 1:
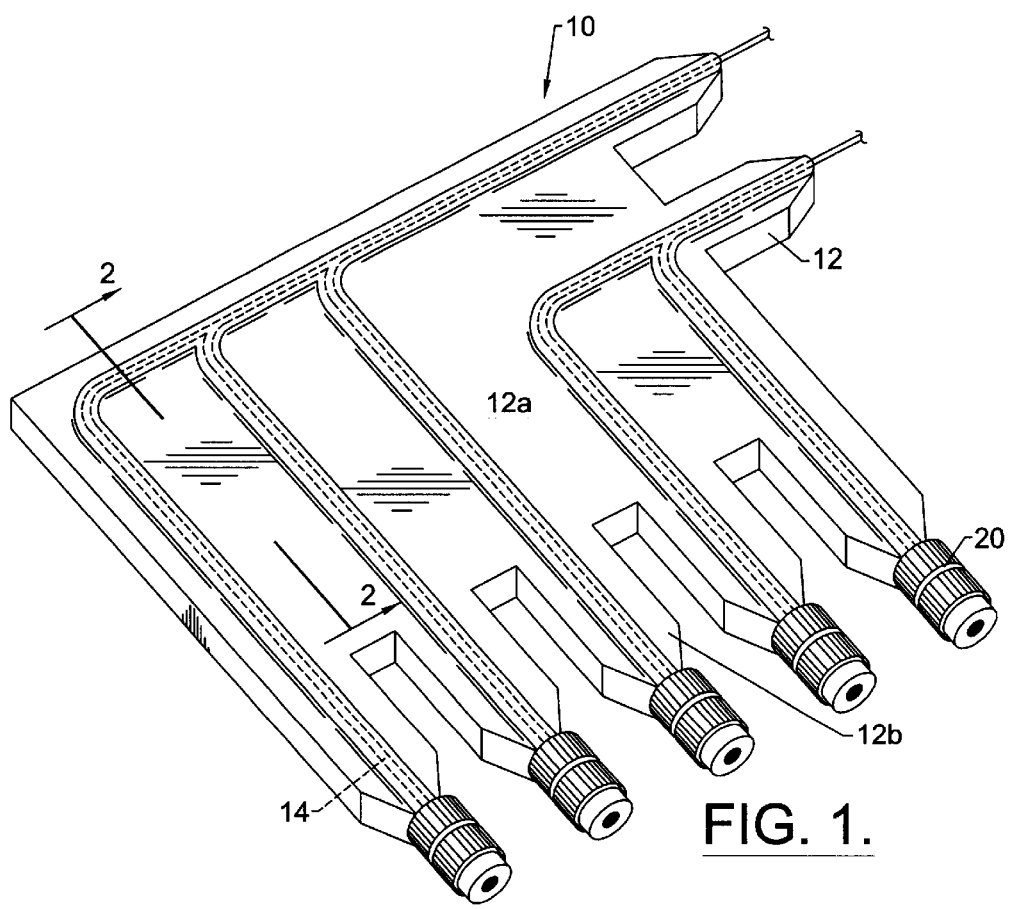
Figure 2:
Figure 3:
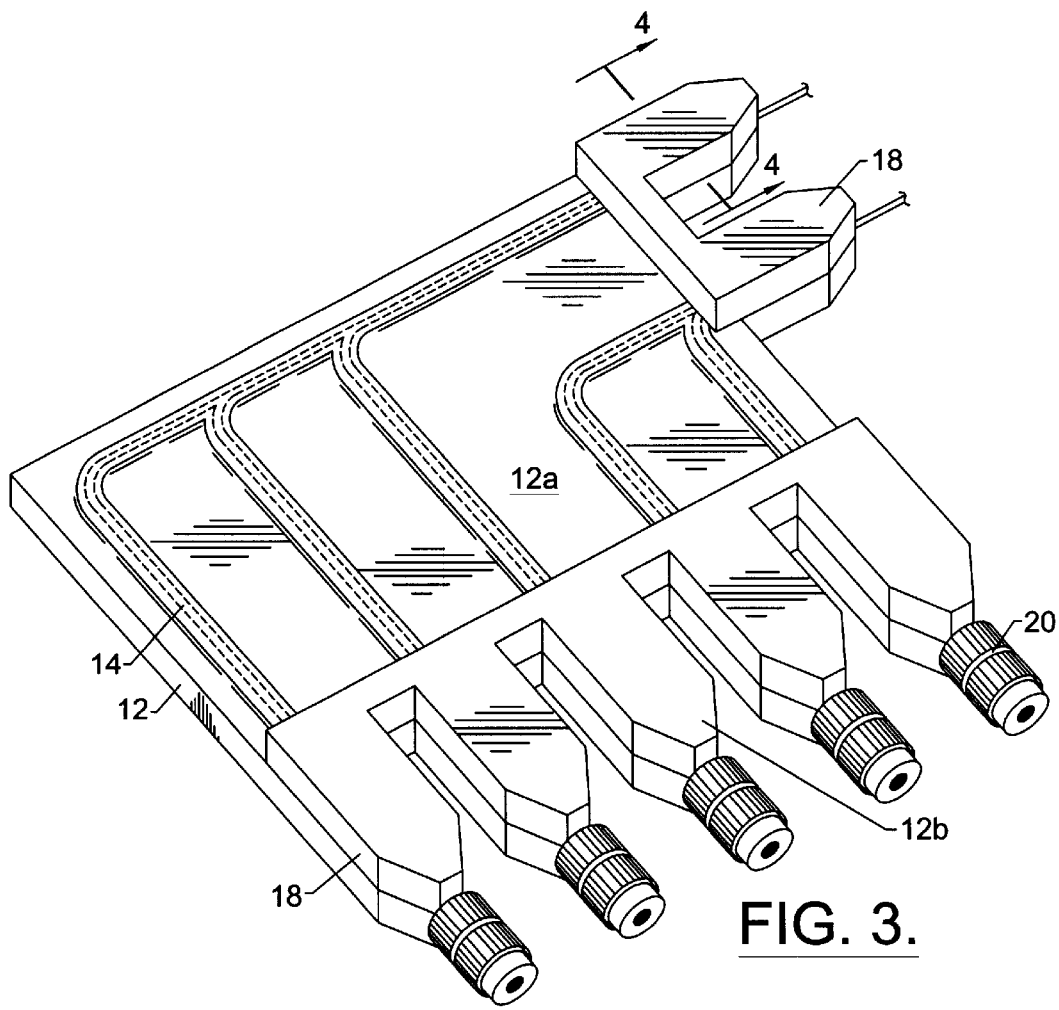
Figure 4:
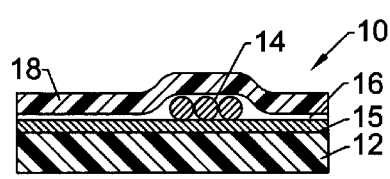
Figure 5:
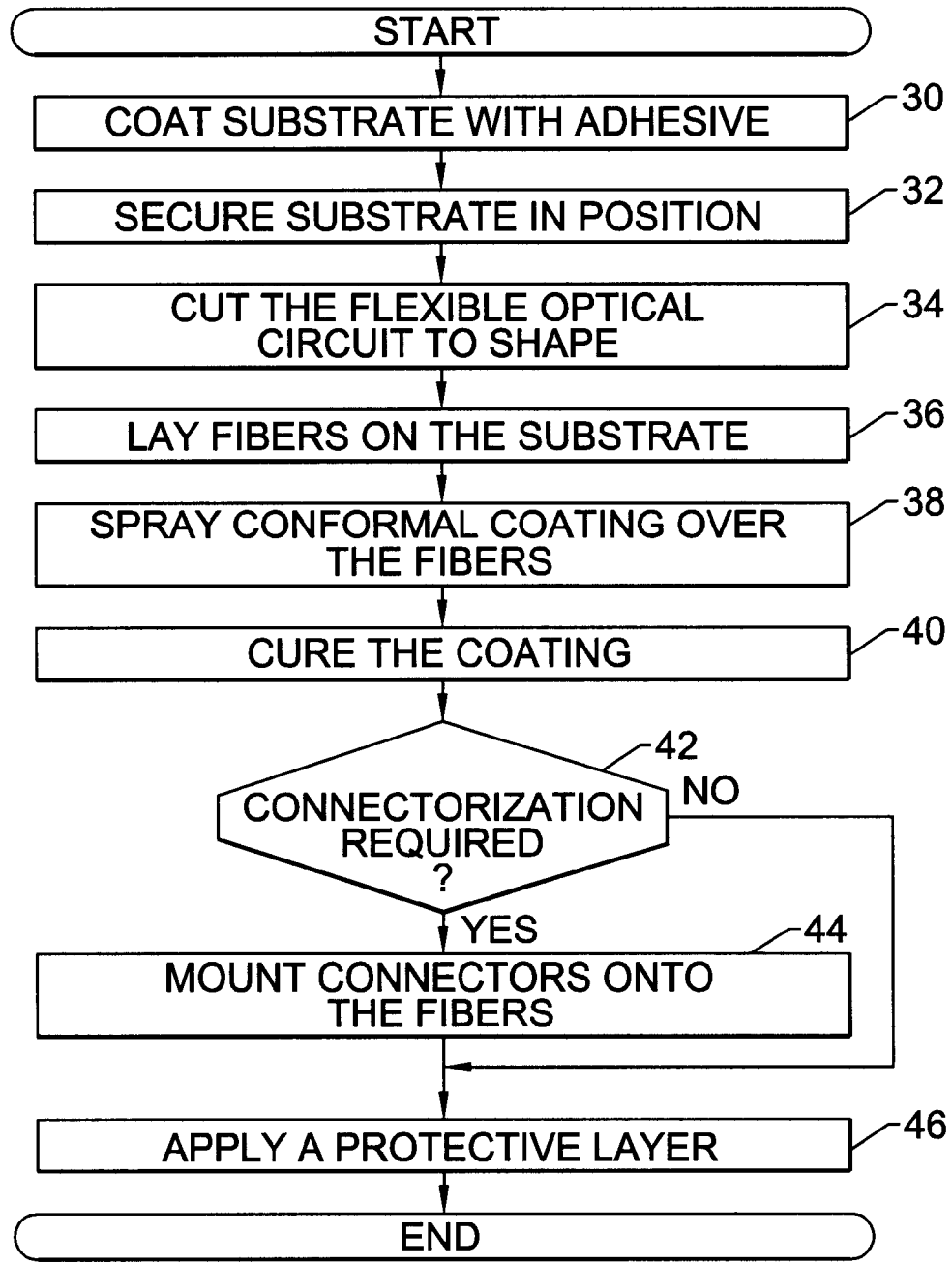

Having thus described the invention in general terms, reference will now be made to the accompanying drawings, which are not necessarily drawn to scale, and wherein:

FIG. 1 is a perspective view of a flexible optical circuit according to one embodiment of the present invention which includes a substrate formed of a foam material;

FIG. 2 is a cross-sectional view of the flexible optical circuit of FIG. 1 taken along line 2—2;

FIG. 3 is a perspective view of a flexible optical circuit according to another embodiment of the present invention which includes both a substrate and a protective layer formed of a foam material;

FIG. 4 is a cross-sectional view of the flexible optical circuit of FIG. 3 taken along line 4—4; and FIG. 5 is a flow chart illustrating the operations performed to fabricate the flexible optical circuit of FIG. 3.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a flexible optical circuit 10 according to one advantageous embodiment to the present invention is illustrated. The flexible optical circuit can be deployed in a variety of applications in order to route optical fibers in an organized and managed fashion. For example, the flexible optical circuits depicted in FIGS. 1 and 3 can be utilized as an optical backplane or the like. However, the flexible optical circuit may be an elongated ribbon, thereby defining a ribbon of optical fibers as commonly utilized for routing optical fibers across relatively long distances. As such, flexible optical circuits, as used herein, includes ribbons of optical fibers as well as other flexible optical circuits utilized for fiber management purposes, such as for optical backplanes and the like.

The flexible optical circuit 10 includes a substrate 12 and at least one and, more commonly, a plurality of optical fibers 14 disposed upon the substrate. As will be apparent, the optical fibers can be disposed upon the substrate in any desired pattern in order to provide the proper routing of the optical fibers. Typically, however, the optical fibers generally extend from beyond one edge of the substrate to beyond another edge of the substrate to facilitate connection with the optical fibers. While the flexible optical circuit of the illustrated embodiments is shown to include a plurality of individual optical fibers, it is noted that the flexible optical circuit of the present invention will typically include optical fibers that extend beyond the edge of the substrate in a ribbonized format.

The optical fibers 14 are typically attached to the substrate 12 such that the position of the optical fibers relative to the substrate is fixed. As such, the flexible optical circuit 10 also generally includes an adhesive 15, such as silicone adhesive, as shown in FIG. 2. The adhesive is typically disposed upon at least that portion of the substrate across which the optical fibers will be routed in order to attach the optical fibers to the substrate. More commonly, however, the entire substrate is coated with the adhesive. Once the optical fibers have been attached to the substrate, a conformal coating 16 may be applied to the surface of the substrate to which the optical fibers are attached. In this regard, the conformal coating is typically formed of a relatively thin layer of silicone that is sprayed over the optical fibers and the substrate in order to protect the flexible optical circuit and to further secure the optical fibers to the substrate. As described below, in embodiments of the flexible optical circuit that include a protective layer 18, the conformal coating may be applied over the protective layer and the exposed portions of the substrate or the conformal coating may be omitted altogether.

According to the present invention, the flexible optical circuit 10 includes at least one layer formed of a foam material. In the embodiment illustrated in FIG. 1 and, in more detail, in the cross-sectional view of FIG. 2, the substrate 12 can be formed of a foam material. As described in more detail herein below, the foam material serves to provide strain relief for the optical fibers 14 and to improve the crush resistance of the flexible optical circuit. The substrate can be formed of a variety of different types of foam materials. Typically, however, the substrate is formed of a silicone or a polyurethane foam. For example, the flexible optical circuit of one embodiment includes a substrate formed of UL94-V0 silicone that is commercially available from Rogers Corporation of Elk Grove Village, Illinois.

The foam material that forms the substrate 12 can have various thicknesses depending upon the application and the desired handling characteristics. In one embodiment, however, the substrate is formed of a silicone or polyurethane foam having a thickness within the range of 1/32 inches to 1/16 inches. Additionally, the foam material that forms the substrate, such as the UL94-V0 silicone, is preferably flame retardant. For example, the foam material may include a halogen or other additive in order to provide the desired flame retardancy. Further, the foam material that forms the substrate preferably has at least one and, most commonly, opposed non-porous surfaces. The adhesive 15 can therefore be applied to a non-porous surface of the foam material to facilitate adhesion of the optical fibers 14 to the underlying substrate.

In embodiments in which the substrate 12 is formed of a silicone or polyurethane foam having a thickness within the range of 1/32 inches to 1/16 inches, the flexible optical circuit 10 preferably has environmental resistance properties that are similar to those of a conventional flexible optical circuit having a comparably sized, polyimide substrate. In this regard, the attenuation of the signals propagating along the optical fibers 14 of the flexible optical circuit is substantially the same for a flexible optical circuit including a substrate formed of silicone or polyurethane foam as for a conventional flexible optical circuit having a polyimide substrate as the temperature and humidity to which the flexible optical circuit is subjected are varied throughout predetermined ranges. However, a flexible optical circuit including a substrate formed of a silicone or polyurethane foam generally has better handling characteristics, i.e., is more flexible, than a conventional flexible optical circuit that includes a polyimide substrate.

As a result of forming the substrate 12 from a foam material, the optical fibers 14 will be subjected to less stress since, among other reasons, the optical fibers will be permitted some movement into and out of the plane defined by the substrate as a result of the compressibility of the foam material that forms the substrate. The reduction in the stress to which the optical fibers are exposed is particularly evident at those points at which the stress would otherwise be concentrated, such as along the edges of the flexible optical circuit 10. In addition, the compressibility of the foam material that forms the substrate also improves the crush resistance of the flexible optical circuit by permitting movement of the optical fibers into and out of the plane defamed by the substrate. As such, additional protection is afforded the optical fibers in instances in which contact is made between the flexible optical circuit and other components within an electronics cabinet or the like. By including a substrate formed of a foam material, the resulting flexible optical circuit is quite flexible, thereby reducing the concentration of stress upon the optical fibers and improving the handling characteristics of the flexible optical circuit so as to facilitate its installation, repair and the like.

As described above, the flexible optical circuit 10 includes at least one layer formed of a foam material. While the substrate 12 may be formed of a foam material as described above, the flexible optical circuit 10 of another embodiment of the present invention includes a protective layer 18 formed of a foam material. The protective layer is disposed upon the substrate and, in embodiments that include a conformal coating 16 upon the substrate, upon the conformal coating that covers the substrate. In instances in which the protective layer is disposed upon the substrate without any intervening conformal coating, the adhesive 15 adheres the protective layer to the substrate. However, in instances in which the substrate is covered with a conformal coating prior to disposing the protective layer upon the substrate, another layer of adhesive, such as silicone adhesive, is preferably applied to either the protective layer or the surface upon which the protective layer is to be disposed in order to adhere the protective layer to the underlying surface. The flexible optical circuit of the illustrated embodiment also includes a substrate which may be formed of a foam material as described above. Alternatively, the substrate may be formed of other materials, such as a polyimide or other engineering thermoplastic materials, such as polyetherimide or polybutylene terphthalate.

As depicted in FIGS. 3 and 4, the protective layer 18 is disposed upon at least a portion of the substrate 12 so as to overlie predetermined segments of the optical fibers 14. In this regard, the protective layer of foam material can overlie the entire substrate including all optical fibers upon the substrate. In this embodiment, the flexible optical circuit 10 need not include a conformal coating between the substrate and the protective layer, although a conformal coating can be applied over the protective layer, if so desired. Alternatively, the protective layer of foam material may be disposed only upon selected portions of the substrate, such as those portions of the substrate that support segments of the optical fibers upon which stress will be concentrated. In these embodiments, the flexible optical circuit can include a conformal coating between the substrate and the protective layer and/or a conformal coating over the protective layer as well as the exposed portions of the substrate.

As shown in FIG. 3, for example, the protective layer 18 of foam material may be disposed along those edges of the substrate 12 across which the optical fibers 14 extend. The protective layer of foam material can therefore protect the optical fibers from the stress that is otherwise concentrated at the edge of the substrate. As will be apparent, the protective layer of foam material can extend inward from the edges of the substrate by any distance. In one embodiment, however, the protective layer of foam material extends about 1 to 2 inches from the edge of the substrate. Similarly, in those embodiments in which fiber optic connectors 20 are mounted upon end portions of the optical fibers, the protective layer of foam material is preferably disposed upon those portions of the substrate proximate the fiber optic connectors since stress would otherwise be concentrated upon the optical fibers at the point at which the fiber optic connectors are mounted thereto. In this regard, it is noted that while the flexible optical circuit 10 of the illustrated embodiments is shown to include a plurality of individual optical fibers, it is noted that the flexible optical circuit will typically include optical fibers that extend beyond the edge of the substrate in a ribbonized format. As such, the fiber optic connectors can be either single fiber connectors, or multifiber connectors in order to be mounted upon a ribbon of optical fibers.

As shown in FIG. 3, the flexible optical circuit 10 of one advantageous embodiment includes a substrate 12 that has a main section 12a and at least one and, more typically, a plurality of tabs 12b extending outwardly from the main section. The flexible optical circuit of this embodiment also includes a plurality of optical fibers 14, each of which extends across the main section of the substrate and along a respective tab. For example, a plurality of optical fibers in a ribbonized format may be supported by and extend from each tab. Each tab can flex or otherwise move in relation to the other tabs and to the main section of the substrate, thereby permitting the optical fibers supported by the tabs to be individually moved or positioned. In this embodiment, the flexible optical circuit also includes a protective layer 18 formed of foam material disposed proximate those edges of the substrate across which the optical fibers extend. In more detail, the flexible optical circuit of this embodiment preferably includes a protective layer of foam material proximate the edges of both the main section of the substrate and the tabs at which the optical fibers enter and exit the flexible optical circuit.

As described above in conjunction with the embodiment in which the substrate 12 is formed of a foam material, the protective layer 18 can be formed of a variety of different types of foam materials, such as silicone or polyurethane foams. In one embodiment, for example, the protective layer is formed of UL94-V0 silicone foam. The protective layer of foam material is also preferably flame retardant. The protective layer of foam material can have various thicknesses depending upon the application. Typically, however, the protective layer has a thickness of between $\frac{1}{32}$ inches and $\frac{1}{16}$ inches. In order to facilitate the adhesion of the protective layer of foam material to the substrate, the protective layer of foam material preferably includes at least one and, more typically, opposed non-porous surfaces. In either instance, the protective layer is positioned such that a non-porous surface faces the substrate.

The protective layer 18 of foam material provides strain relief for the optical fibers 14 by accommodating at least some relative movement of the optical fibers. As such, the protective layer of foam material is preferably disposed upon at least those portions of the substrate 12 at which the stress otherwise would be concentrated upon the optical fibers, as described above. Additionally, the protective layer of foam material provides at least some crush resistance for those segments of the optical fibers that underlie the protective layer of foam material.

While the flexible optical circuit 10 of the present invention can be fabricated in various manners, one advantageous method for fabricating a flexible optical circuit that includes both a substrate 12 formed of a foam material and a protective layer 18 formed of a foam material is illustrated in FIG. 5 and will be described hereinafter for purposes of illustration. As mentioned above, however, the flexible optical circuit need not include both a substrate and a protective layer formed of a foam material and may include only a single layer of foam, if so desired. In the illustrative method, however, the substrate is formed of a foam material. Adhesive 15, such as a silicone adhesive, is initially applied to one surface of the substrate as shown in block 30 of FIG. 5. In this regard, the foam material that forms the substrate has at least one and, most commonly, opposed nonporous surfaces. As such, the adhesive is preferably applied to a non-porous surface of the foam material to facilitate adhesion therewith. The substrate is then secured in position. See block 32. For example, the substrate may be placed upon a vacuum table, may be secured electrostatically, may be secured with double-sided tape or may otherwise be fixed in position. In the illustrated embodiment, the substrate is then formed into the desired shape, such as by cutting the substrate into the desired shape as shown in block 34. Alternatively, the substrate may be formed into the desired shape at other stages in the fabrication process, if so desired. The optical fibers 14 are then laid upon the adhesive coated surface of the substrate in the desired pattern, as shown in block 36. In the illustrated embodiment, a conformal coating 16, also typically formed of silicone, is then sprayed over the optical fibers and upon the adhesive coated surface of the substrate. See block 38. The conformal coating is then cured, typically by heating or by ultraviolet curing. See block 40. As described above, however, the conformal coating may be applied at a later stage in the fabrication process, such as following the application of the protective layer 18. Still further, the conformal coating may be omitted altogether, especially in instances in which the protective layer covers the entire substrate.

It is then determined if fiber optic connectors 20 are to be mounted upon one or more of the optical fibers 14. See block 42 of FIG. 5. If so, the fiber optic connectors are mounted upon the end portions of the respective optical fibers in a conventional manner known to those skilled in the art. See block 44. According to this embodiment that includes both a substrate 12 and a protective layer 18 formed of a foam material, a protective layer of foam material is then applied, either to the entire substrate or to selected portions of the substrate. See block 46. As described above, the protective layer of foam material is typically applied to those portions of the substrate that support segments of the optical fibers upon which stress would otherwise be concentrated, such as along the edges of the substrate and proximate the fiber optic connectors. In this regard, the fiber optic connectors are typically mounted upon the end portions of respective optical fibers such that the substrate extends into the connector boot and the rearward end of the spring push element, while the protective layer of foam material is applied to the substrate so as to abut the rearward end of the connector boot.

The protective layer 18 is applied by initially forming the foam material into the desired shape, such as by cutting the foam material into the desired shape. In embodiments in which the flexible optical circuit 10 includes a conformal coating 16 between the substrate 12 and the protective layer, the protective layer is typically adhered to the conformal coating by means of an adhesive, such as a silicone adhesive, that is applied to the surface of the protective layer facing the substrate and/or to the surface upon which the protective layer will be disposed. As such, at least the surface of the protective layer that faces the substrate is preferably non-porous so as to facilitate the adhesion of the protective layer and the substrate. As the foregoing fabrication method evidences, the improved flexible optical circuits 10 of the present invention can therefore be efficiently fabricated by reducing the time required for manufacture and the costs of manufacture relative to the fabrication of conventional flexible optical circuits that include shrink tubing and/or strain relief boots.

Regardless of the method by which the flexible optical circuit 10 is fabricated, the flexible optical circuit 10 provides strain relief for the optical fibers 14 as a result of the inclusion of a layer of foam material. As a result of the strain relief, the improved flexible optical circuit can transmit signals with lower levels of attenuation. Moreover, the improved flexible optical circuit provides improved crush resistance, thereby protecting the flexible optical circuit and, in particular, the optical fibers from physical damage as a result of contact with other components within an electronics cabinet, closure or the like. Additionally, the improved flexible optical circuits of the present invention and, in particular, those embodiments of the improved flexible optical circuits that include a substrate formed of a foam material are quite flexible, thereby reducing the concentration of stress upon the optical fibers and improving the handling characteristics of the flexible optical circuit so as to facilitate installation, repair and the like of the improved flexible optical circuit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A flexible optical circuit comprising:
a substrate formed of a foam material;
adhesive disposed upon at least a portion of said substrate;
at least one optical fiber attached to said substrate with said adhesive such that the foam material that forms said substrate provides strain relief for said at least one optical fiber;
a layer of foam material disposed upon at least a portion of said substrate so as to overlie at least a segment of said at least one optical fiber; and
at least one fiber optic connector mounted upon a respective optical fiber, wherein said layer of foam material is disposed proximate said at least one fiber optic connector.

2. A flexible optical circuit comprising:
a substrate formed of a foam material, wherein said substrate comprises a main section and at least one tab extending outwardly from said main section;
adhesive disposed upon at least a portion of said substrate;
at least one optical fiber attached to said substrate with said adhesive such that the foam material that forms said substrate provides strain relief for said at least one optical fiber; and
a layer of foam material disposed upon at least a portion of said substrate so as to overlie at least a segment of said at least one optical fiber, wherein said layer of foam material is disposed upon at least a portion of said at least one tab.

3. A flexible optical circuit comprising:
a substrate formed of a foam material;
adhesive disposed upon at least a portion of said substrate;
at least one optical fiber attached to said substrate with said adhesive such that the foam material that forms said substrate provides strain relief for said at least one optical fiber; and
a conformal coating disposed upon said substrate and overlying said at least one optical fiber.

4. A flexible optical circuit according to claim 3 further comprising a layer of foam material disposed upon at least a portion of said substrate so as to overlie at least segment of said at least one optical fiber.

5. A flexible optical circuit according to claim 4 wherein said layer of foam material is disposed proximate an edge of said substrate.

6. A flexible optical circuit according to claim 3 wherein the foam material that forms said substrate comprises a non-porous surface upon which said adhesive is disposed.

7. A flexible optical circuit according to claim 3 wherein the foam material that forms said substrate is flame retardant.

8. A flexible optical circuit according to claim 3 wherein the foam material that forms said substrate is selected from the group consisting of silicone and polyurethane.

9. A flexible optical circuit comprising:
a substrate comprising a main section and at least one tab extending outwardly from said main section;
at least one optical fiber disposed upon said substrate;
a layer of foam material disposed upon at least a portion of said substrate so as to overlie at least a segment of said at least one optical fiber such that the foam material provides strain relief for said at least one optical fiber as the optical circuit flexes, wherein said layer of foam material is disposed upon at least a portion of said at least one tab; and adhesive disposed between said layer of foam material and said substrate for securely affixing said layer of foam material.

10. A flexible optical circuit according to claim 9 further comprising at least one fiber optic connector mounted upon a respective optical fiber, wherein said layer of foam material is disposed proximate said at least one fiber optic connector.

11. A flexible optical circuit comprising:
   a substrate;
   at least one optical fiber disposed upon said substrate;
   a layer of foam material disposed upon at least a portion of said substrate so as to overlie at least a segment of said at least one optical fiber such that the foam material provides strain relief for said at least one optical fiber as the optical circuit flexes;
   a conformal coating disposed upon said substrate and overlying said at least one optical fiber, wherein said layer of foam material is disposed upon said conformal coating; and
   adhesive disposed between said layer of foam material and said conformal coating for securely affixing said layer of foam material.

12. A flexible optical circuit according to claim 11 wherein said layer of foam material is disposed proximate an edge of said substrate.

13. A flexible optical circuit according to claim 11 wherein said layer of foam material comprises a non-porous surface facing said substrate and said at least one optical fiber.

14. A flexible optical circuit according to claim 11 wherein said layer of foam material is flame retardant.

15. A flexible optical circuit according to claim 11 wherein said layer of foam material is formed of a foam selected from the group consisting of silicone and polyurethane.

16. A flexible optical circuit according to claim 11 wherein said substrate is also formed of a foam material.

17. A flexible optical circuit according to claim 11 further comprising an adhesive disposed upon at least a portion of said substrate for securing said at least one optical fiber to said substrate.

18. A flexible optical circuit comprising:
   a substrate comprising a main section and at least one tab extending outwardly from said main section;
   at least one optical fiber disposed upon said substrate;
   a protective layer disposed upon at least a portion of said substrate so as to overlie at least a segment of said at least one optical fiber, and wherein said protective layer is disposed upon at least a portion of said at least one tab; and
   adhesive disposed between said protective layer and said substrate for securely affixing said protective layer,
   wherein at least one of said substrate and said protective layer are formed of a foam material in order to provide strain relief for said at least one optical fiber as the optical circuit flexes.

19. A flexible optical circuit according to claim 18 wherein said protective layer is disposed proximate an edge of said substrate.

20. A flexible optical circuit according to claim 18 further comprising at least one fiber optic connector mounted upon a respective optical fiber, wherein said protective layer is disposed proximate said at least one fiber optic connector.

21. A flexible optical circuit comprising:
   a substrate;
   at least one optical fiber disposed upon said substrate;
   a protective layer disposed upon at least a portion of said substrate so as to overlie at least a segment of said at least one optical fiber;
   a conformal coating disposed upon said substrate and overlying said at least one optical fiber, wherein said protective layer is disposed upon said conformal coating; and
   adhesive disposed between said protective layer and said conformal coating for securely affixing said protective layer,
   wherein at least one of said substrate and said protective layer are formed of a foam material in order to provide strain relief for said at least one optical fiber as the optical circuit flexes.

22. A flexible optical circuit according to claim 21 wherein both said substrate and said protective layer are formed of the foam material.

23. A flexible optical circuit according to claim 21 wherein the foam material comprises a non-porous surface facing said at least one optical fiber.

24. A flexible optical circuit according to claim 21 wherein the foam material is flame retardant.

25. A flexible optical circuit according to claim 21 wherein the foam material is selected from the group consisting of silicone and polyurethane.

26. A flexible optical circuit according to claim 21 further comprising an adhesive disposed upon at least a portion of said substrate for securing said at least one optical fiber to said substrate.

* * * * *